Figure 2:
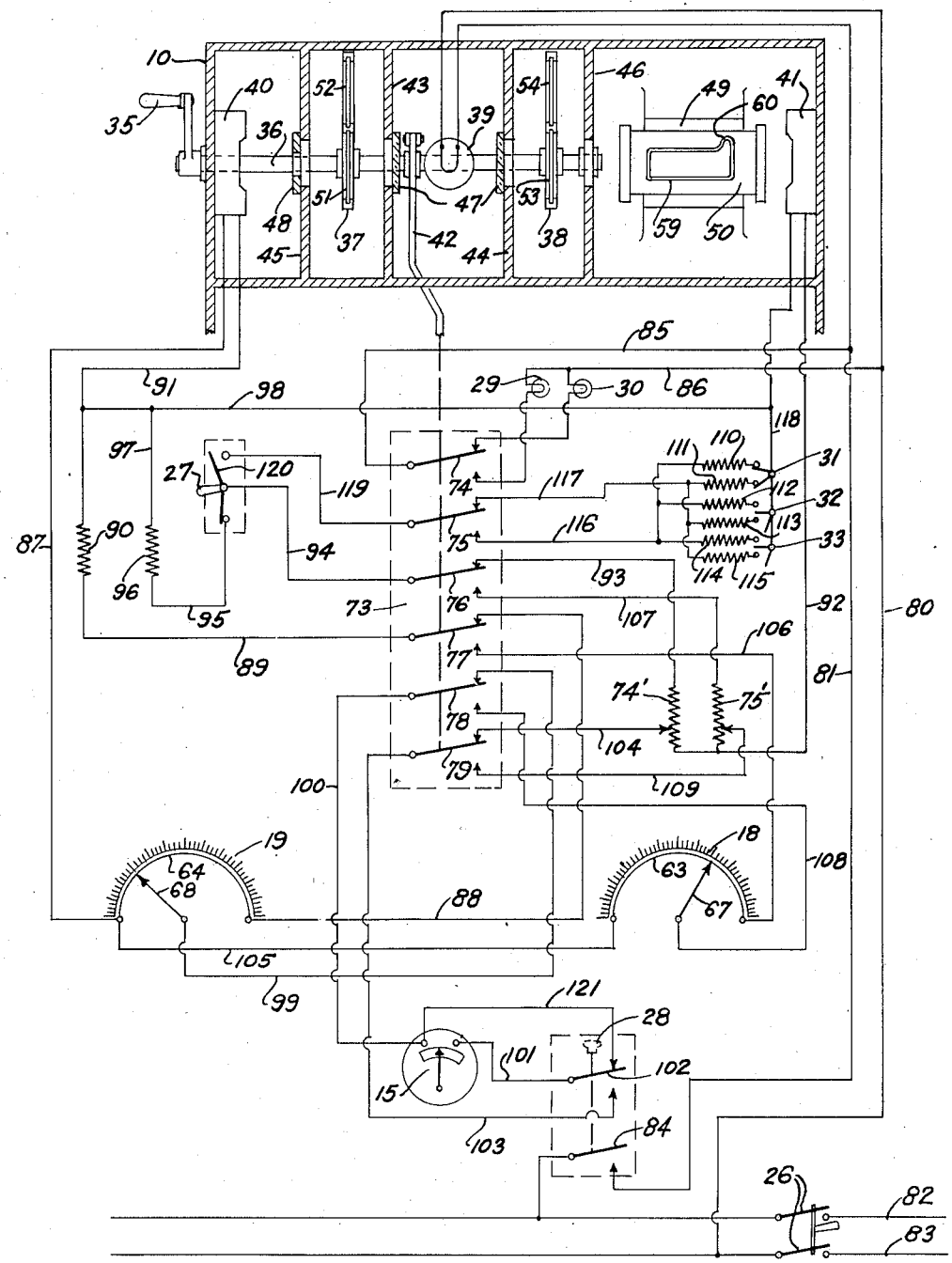

Aug. 22, 1944. T. R. GILLETT ET AL 2,356,238
PHOTOELECTRIC APPARATUS FOR MEASURING COLOR AND TURBIDITY
Filed May 2, 1941 4 Sheets-Sheet 1
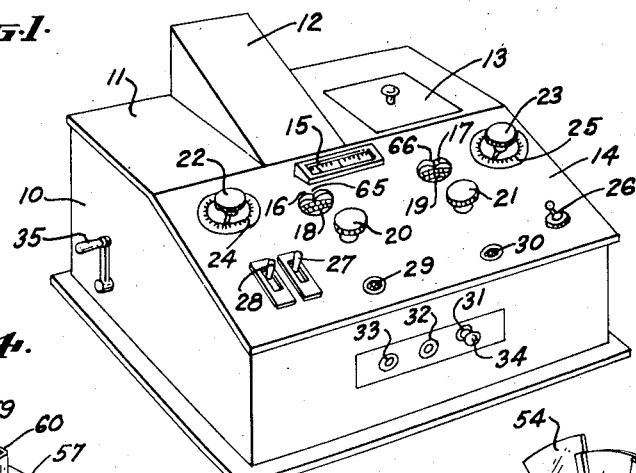
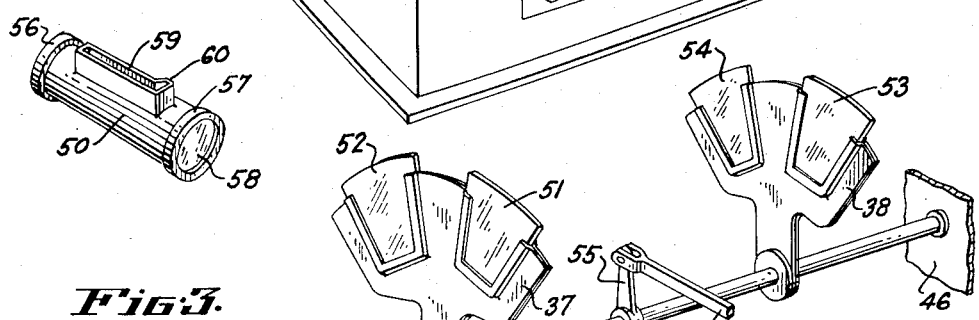
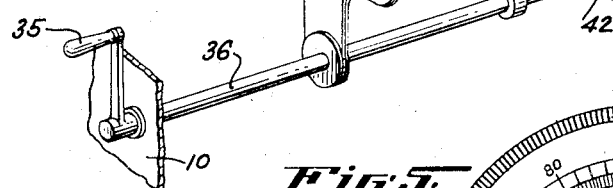
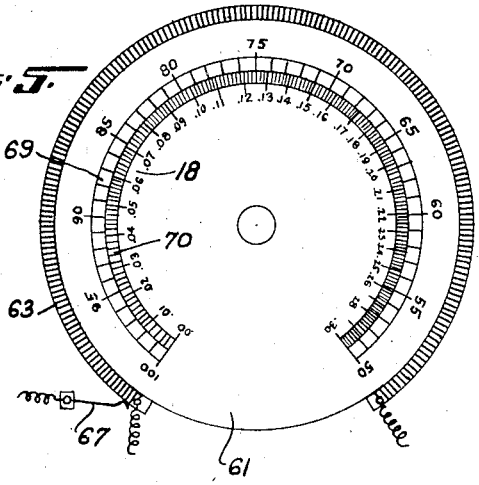
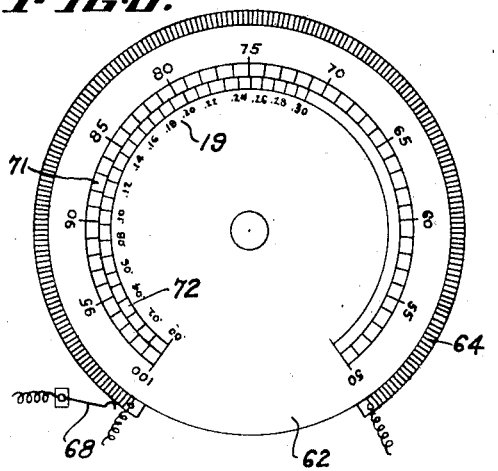
INVENTORS.
THOMAS R. GILLETT
PHILIP F. MEADS
ALFRED L. HOLVEN
BY
ATTORNEY.

Aug. 22, 1944.  T. R. GILLETT ET AL  2,356,238
PHOTOELECTRIC APPARATUS FOR MEASURING COLOR AND TURBIDITY
Filed May 2, 1941   4 Sheets-Sheet 2

INVENTORS.
THOMAS R. GILLETT
PHILIP F. MEADS
ALFRED L. HOLVEN
BY
ATTORNEY.

Aug. 22, 1944.   T. R. GILLETT ET AL   2,356,238
PHOTOELECTRIC APPARATUS FOR MEASURING COLOR AND TURBIDITY
Filed May 2, 1941   4 Sheets-Sheet 3

INVENTORS.
THOMAS R. GILLETT
PHILIP F. MEADS
ALFRED L. HOLVEN
BY
ATTORNEY

Aug. 22, 1944. T. R. GILLETT ET AL 2,356,238
PHOTOELECTRIC APPARATUS FOR MEASURING COLOR AND TURBIDITY
Filed May 2, 1941 4 Sheets-Sheet 4

INVENTORS
THOMAS R. GILLETT
PHILIP F. MEADS
ALFRED L. HOLVEN
ATTORNEY

Patented Aug. 22, 1944

2,356,238

UNITED STATES PATENT OFFICE 2,356,238

PHOTOELECTRIC APPARATUS FOR MEASURING COLOR AND TURBIDITY

Thomas R. Gillett, Crockett, Philip F. Meads, Richmond, and Alfred L. Holven, Crockett, Calif.

Application May 2, 1941, Serial No. 391,524

20 Claims. (Cl. 88—14)

The present invention relates to the photoelectric measurement of color and turbidity of light colored liquids containing small amounts of suspended matter, and more particularly to an apparatus for measuring the total light transmittance characteristics of light colored liquids in which the effect of turbidity is indicated and/or compensated for and the actual color value of the liquid is obtainable in a direct manner.

It is an object of the present invention to provide a new and novel apparatus for measuring the color and turbidity of light colored liquids.

Another object of the invention is to provide a means for measuring the color value of light colored liquids and in which compensation is made for the interfering effects of turbidity.

A further object of the invention is to provide a new and novel photoelectric device having turbidity compensation by means of which the color value of light colored liquids may be obtained in a direct manner.

A still further object of this invention is to provide photoelectric means for measuring the color of white sugar solutions and automatically compensating for the turbidity contained therein.

In measuring the color of liquids and transparent solids, photoelectric methods and apparatus have gradually replaced the older and less accurate visual methods of determination. Among such photoelectric measuring devices is the apparatus described by Holven and Gillett in their earlier Patent No. 2,273,356, dated February 17, 1942, entitled Photoelectric color measuring and analyzing apparatus.

Another prior art device that is also related to the present invention is illustrated and described in Holven and Gillett Patent No. 2,152,645, issued April 4, 1939. The above and other photoelectric color measuring devices, unlike the present device, were developed essentially for measuring the color of dark colored products and they are, therefore, inherently not well suited for measuring the color and turbidity of light colored liquids. This is due primarily to the fact that a sufficient depth of sample is not employed and also to the fact that accurate measurements on such light colored products are not generally possible due to the small amounts of coloring material normally present in such light colored liquids and the interfering effect of turbidity on such measurements.

Just why turbidity should interfere so seriously in connection with the measurements of color in light colored solutions and not seriously affect similar measurements in dark colored solutions will become apparent when it is recognized that with dark solutions as much as 50% to 75% of the light is absorbed by the color producing elements, whereas the additional light absorption, due to turbidity, will be small when compared therewith and, consequently, it may be and sometimes is ignored without introducing any appreciable error in the measurements. On the other hand, with a pale colored solution, where only about 5% of the total light transmitted is absorbed by the color producing elements, it will be seen that the additional light absorption, due to turbidity, will be relatively greater and much more pronounced and, consequently, the turbidity of these light colored solutions cannot be ignored where an actual color value measurement is desired. In extreme cases the light absorption, due to turbidity, may amount to as much as 50% of the total light absorption of the solution.

Heretofore, no practical means has been provided to avoid or eliminate the error in color measurements caused by turbid matter in a solution and it is, therefore, the purpose of the present invention to provide a new and novel means for measuring the actual color of a solution by compensating for the error in such color measurments that may be caused by turbidity.

In accordance with a preferred embodiment of our invention, we employ a composite photoelectric cell circuit having two photoelectric cells that are adapted to be influenced by transmitted light as modified by filters having different spectral characteristics and in which a novel filter and switching arrangement is used to render the composite photoelectric cell circuit responsive to the light absorption characteristics of a sample under these conditions. In other words, under one condition of operation, the composite photoelectric circuit is adapted to indicate the total light absorption of a sample as it is affected by both the color and turbidity of the solution, and in another condition of operation, the composite photoelectric circuit is adapted to indicate the turbidity alone of the solution. With these two indications, it is then possible, by a simple mathematical subtraction, to determine the actual color value of the solution. At this point it should be particularly pointed out that in order to photoelectrically measure the total absorption and the turbidity of a solution and determine the actual color of a solution with compensation for turbidity, as contemplated by our present invention, it is necessary that the values indicated by the measuring circuit be in units corresponding to the percentage of total light absorption of the sample in each spectral range.

The only prior art apparatus of which we have knowledge that is capable of measuring light in terms of absorption in a direct manner and in absolute units is that disclosed by Messrs. Holven and Gillett in their above identified earlier patents and we have, therefore, in our present application, adopted the basic circuit of these prior disclosures in a modified form to accomplish our present objects. With this invention it is possible to measure the light absorption values of a sample under different spectral conditions and in a direct manner and, as will hereinafter appear, it is considered that this is an outstanding novel feature of the present invention.

Other novel features of our disclosure reside in the provision of apparatus for measuring color by means of which a measure of turbidity, uninfluenced by color, is obtainable; the use of a novel photoelectric balanced circuit in which the range of adjustment has been greatly increased; a unique arrangement for the movement of color filters that will assure their proper alignment and coordination with their respective circuits; a novel means for originally balancing the apparatus without the continual use of a reference standard; means for obtaining a measure of both color and turbidity in fundamental color units based on sound physical laws; means for adjusting the initial balance of the circuit to permit the use of sample containing vessels of different lengths; and a unique means for obtaining a corrected true color reading in a direct manner; all of which will be set forth in more detail hereinafter. For a better understanding of the invention, reference should now be had to the accompanying drawings, wherein there is shown by way of illustration and not of limitation preferred embodiments thereof.

Figure 7:
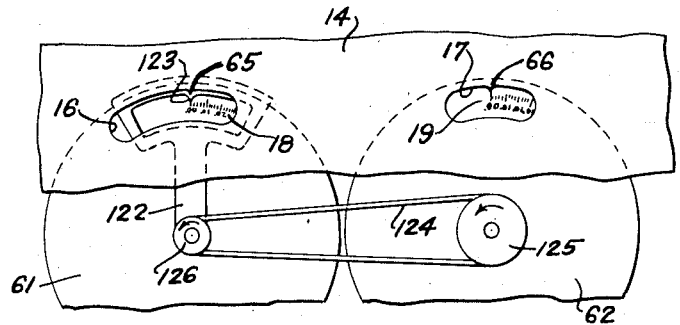
Figure 8:
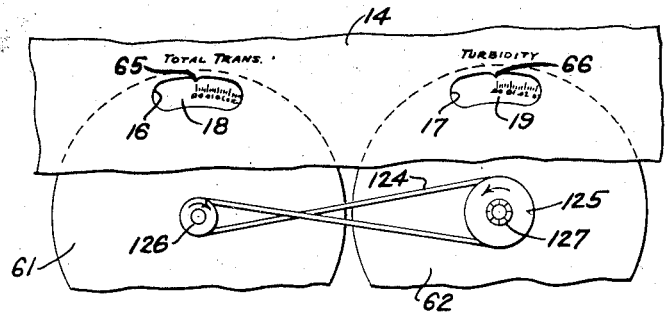
Figure 9:
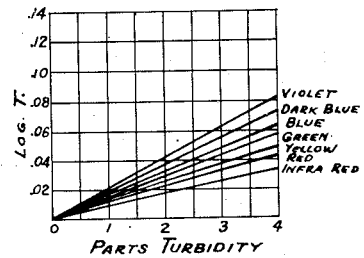
Figure 10:
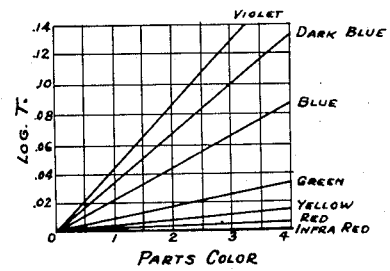
Figure 11:
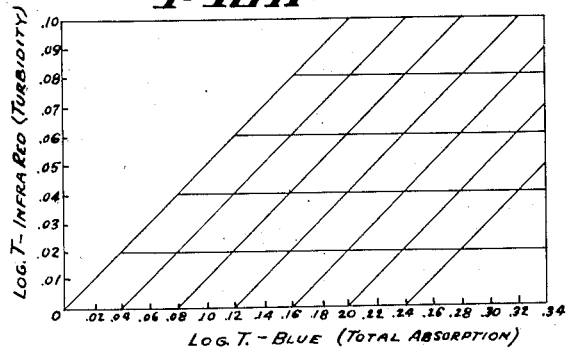
Figure 12:
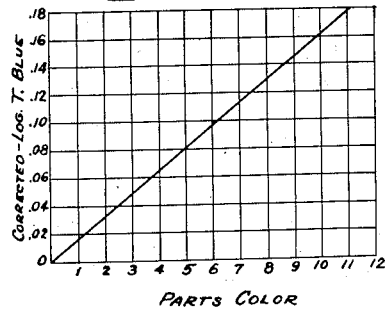
Figure 13:
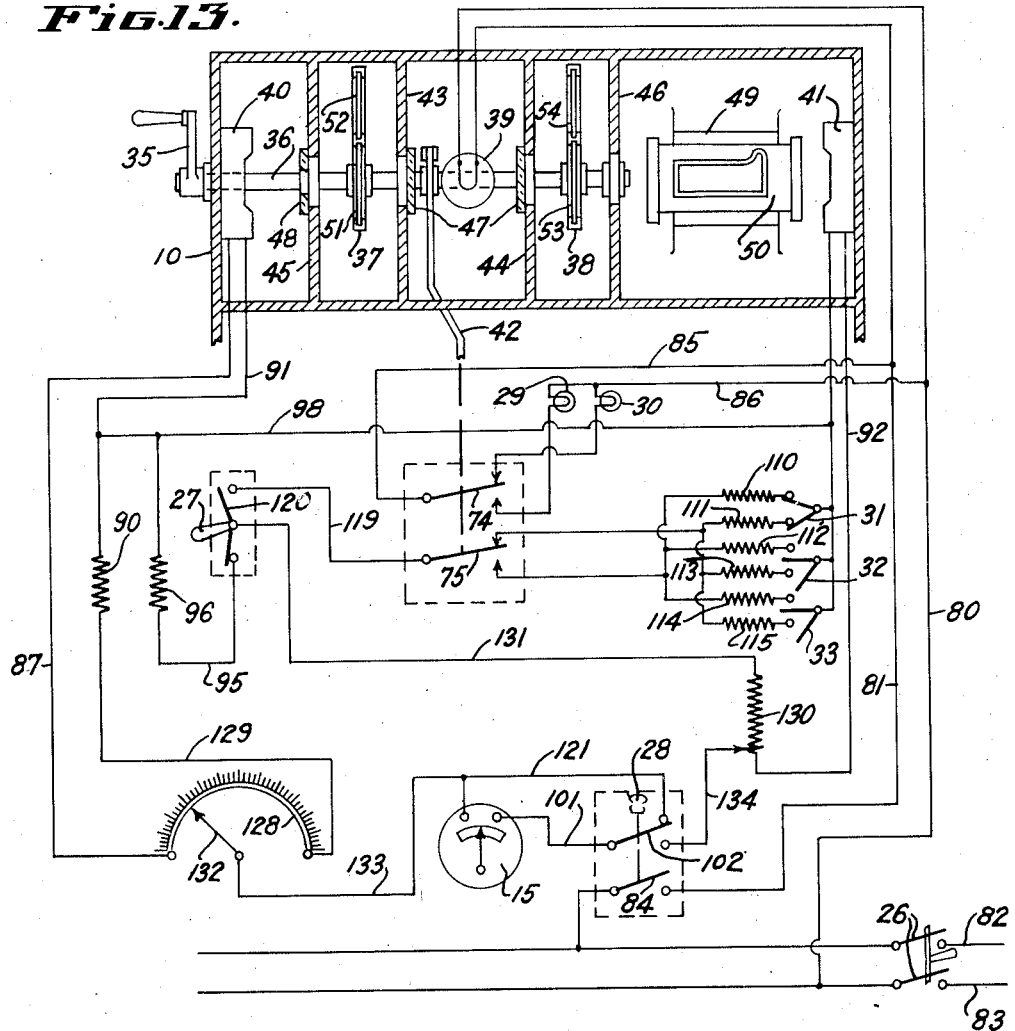
Figure 14:
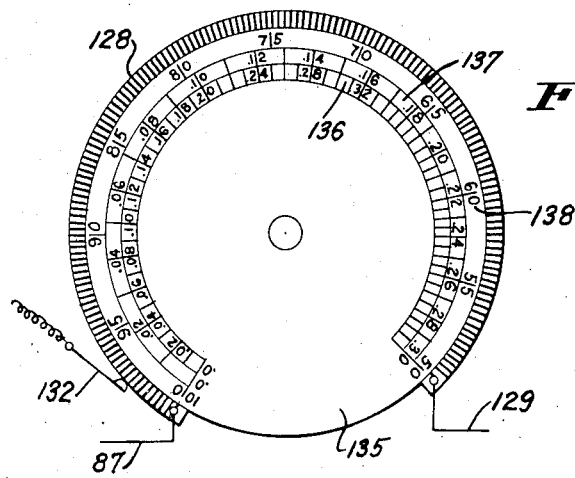

In the drawings, wherein like numerals refer to like parts throughout the several views;

Figure 1 is a perspective view showing the exterior of one embodiment of the invention, Figure 2 is a schematic diagram showing a partial cross-sectional view through a portion of the apparatus and the electrical circuits associated therewith, Figure 3 is a fragmentary perspective view showing the manner in which the spectral character of the photoelectric cell influencing light beams is controlled, Figure 4 is a perspective view of a preferred type of sample containing vessel employed with this invention, Figure 5 is a detailed view of the total absorption measuring slidewire with its associated direct reading scale, Figure 6 is a similar detailed view of the turbidity measuring slidewire showing the direct reading scale associated therewith, Figure 7 is a fragmentary diagrammatic view showing a modification of the invention by which the actual color value of a sample with correction for turbidity may be read directly from the total absorption indicating scale, Figure 8 is a view similar to Figure 7 showing a further modification by means of which the last above object is accomplished in a different manner, Figure 9 shows a plurality of curves obtained by plotting the light absorption of sample solutions against their turbidity with color filters transmitting light of various wave lengths, Figure 10 shows a plurality of curves obtained by plotting the light absorption of solutions against their color with color filters that transmit light at various wave lengths, Figure 11 is a graph showing the relationship between the —Log T values for the two color filters preferably employed in this invention, Figure 12 is a graph showing the relationship between the photoelectrically corrected color value as obtained by this invention and the actual parts of coloring matter, Figure 13 is a schematic diagram and electrical circuit illustrating a modification of the present invention, and Figure 14 is a detailed view showing the calibrations used with a single measuring slidewire suitable for use with the arrangement illustrated in Figure 13.

Before taking up a detailed description of the invention as illustrated by the accompanying drawings, it is believed that a consideration of the following will be helpful in gaining a full and complete appreciation thereof. In measuring the color of most liquids, it is now the general practice to first clarify the solution by filtration in order to eliminate the interfering effect of turbidity, and in the case of dark colored solutions, it is often necessary to dilute the solution in order to bring its color within the range of the instrument being employed. In the case of light colored solutions, such as a white sugar solution, for which the present invention is primarily designed, neither of the above steps is practicable. Experience has shown that filtration of such solutions will not produce perfect optical clarity and that dilution is also obviously not desirable because of the small amount of color present. Where color measurements have been made of white sugar solutions in the past, the solution has been measured at its maximum density and the interfering effect of turbidity has been ignored with the result that the measurements previously relied upon have not in fact been an indication of the actual or true color of the solution. As explained previously, the presence of a small amount of turbid matter in such pale colored solutions constitutes a distinct source of error in any readings that may be taken. This is particularly true where solutions having a varying turbidity are involved. Furthermore, it should be pointed out that because of the extremely long column of solution that is required in order to exaggerate the small amount of color in a light colored solution, most photoelectric colorimeters are not suitable for use in measuring the color of such solutions and, therefore, the visual method of comparison is generally resorted to. By this latter method the samples are placed in long glass cylinders and the color of a sample is visually compared with the color of a known standard solution. This and other visual methods and instruments are, of course, subject to considerable error because of optical defects and variations in the sight of different observers, the inability of observers to reproduce their results, and the error which results from the interfering effect of the turbidity of the solution in such comparisons.

In accordance with the present invention, the above objections are fully and completely overcome by the use of photoelectric means responsive to the light transmission characteristics of a sample at two widely separated wave lengths and in which the measurements so obtained may be correlated in a manner that will indicate in a direct manner the actual color and turbidity of a sample. In accordance with the preferred embodiment of the invention, one of these photoelectric measurements is taken with a blue light to indicate the total light absorption that is due to both the color and turbidity of the sample, and the other measurement is taken with an infra-red light as an indication of the turbidity alone of the solution. Then, by a simple comparison of these two readings, it is possible to determine in a direct manner the actual color of the sample under test.

While it is possible that different colored light beams might be used with the photoelectric measuring circuit in obtaining an indication of the total absorption (color plus turbidity), we prefer to use a blue light because of its higher transmission value per unit of color. In regard to the measurements of turbidity, it has been discovered that when an infra-red light beam is used, the measurements thus obtained are not affected by visible color. This use of an infra-red light beam as a means for determining the turbidity of a solution in a direct manner is, therefore, considered novel as it completely avoids the error that would be introduced by the use of a visible light beam. The choice of these two spectral ranges in connection with the photoelectric measuring circuits here disclosed also avoids the disadvantages inherent in the application of arbitrary or empirical calibrations and produces an indication of the color of the solution in fundamental units based on sound physical laws. In other words, the light transmission is measured in $-\text{Log } T$ units; i. e., the minus logarithm of the percent transmission in accordance with Beer's law. It is of special importance to here note that all color and turbidity measurements taken with our present device are based on a straight line relationship and, as a result, the balancing photoelectric circuits and their associated indicating scales can be calibrated in percent transmission units to thus give an indication of the color and turbidity of a solution in a direct reading manner.

For the purpose of describing the apparatus contemplated by our invention, reference will first be made to Figures 1 and 2 of the drawings, after which a more detailed description of the several elements, together with their mode and principle of operation, will be described in connection with the remaining figures of the drawings.

As illustrated in Figure 1, the complete color measuring apparatus is adapted to be enclosed in a single cabinet 10 which, as will hereinafter appear, is preferably divided longitudinally to provide a front and a rear compartment. The rear compartment is here shown as having a top 11 with a ventilating hood 12 and a removable cover 13 which, when removed, will permit the insertion of a vessel containing a sample liquid the color of which is to be determined. Disposed over the front compartment there is an inclined panel 14 upon which is mounted a zero balance galvanometer 15 that is preferably of the light beam type. It is to be understood, however, that any similar indicating instrument may be substituted and also mounted at any suitable location. Arranged upon the panel 14 and immediately below the galvanometer 15 there is a pair of sight apertures 16 and 17 through which calibrated scales 18 and 19 are visible. For the purpose of rotating the calibrated scales 18 and 19 with respect to the apertures 16 and 17, the panel 14 also carries suitable operating knobs 20 and 21. Adjacent the apertures 16 and 17 the panel 14 also carries other operating knobs 22 and 23 that are adapted to control adjustable balancing resistances which are included in the photoelectric circuit. These operating knobs 22 and 23 are shown as having pointers associated respectively with dial plates 24 and 25 by means of which the movement thereof may be observed when desired. At the lower right-hand corner of the panel 14 there is a main circuit controlling switch 26 and at the lower left-hand corner of the panel 14, there are arranged two key switches 27 and 28, the purpose of which will also hereinafter appear. In addition to the above control elements, the panel 14 carries two indicating lamps 29 and 30 that are adapted to indicate the position of the light beam and circuit controlling apparatus under different conditions of operation, as will later appear. In addition to the various control elements described above as mounted upon the panel 14, the cabinet 10 is also provided with three jack-type receptacles 31, 32 and 33 into any one of which a suitable operating jack 34 is adapted to be inserted for a purpose to be hereinafter described. At the left-hand end of the cabinet 10 there is also an extending crank 35 by means of which a series of filters and coordinating circuit establishing switches are controlled.

Upon referring to Figure 2 of the drawings, it will be noted that the crank 35 is mounted upon a shaft 36 that extends into the rear compartment of the cabinet 10 so as to form a support for two filter carrying members 37 and 38 which serve to position suitable light beam modifying filters, to be hereinafter described, between a source of light 39 and photoelectric cells 40 and 41 arranged respectively at the left and right-hand ends of the rear compartment of the cabinet 10. Associated with the shaft 36 there is also a switch operating means 42 that serves to establish suitable measuring circuits for the photoelectric cells 40 and 41 as the different filter means are interposed between the light source 39 and these photoelectric cells. The light source 39 is shown as located in a chamber formed by apertured partitions 43 and 44 and the filter carrying members 37 and 38 are likewise enclosed in adjacent chambers formed by additional apertured partitions 45 and 46. For the purpose of protecting the photoelectric cells 40 and 41 from the influence of heat generated by the light source 39, the apertures of the partitions 43 and 44 are shown as provided with transparent closure plates 47. At this point it should also be pointed out that the partition 45 adjacent the photoelectric cell 40 is provided with an adjustable or interchangeable apertured plate 48 that serves to restrict the light beam that is projected from the light source 39 upon the photoelectric cell 40. The purpose of this apertured plate 48 is to be described in more detail hereinafter. Adjacent the photoelectric cell 41 in the rear compartment of the cabinet 10 is a suitable saddle-like support 49 that is adapted to position a suitable liquid containing vessel 50 in alignment with the light beam which is projected from the light source 39 upon the photoelectric cell 41. With the apertured partitions 43, 44, 45 and 46 arranged as above described, it will be seen that the light beams projected from the light source 39 upon the photoelectric cells 40 and 41 will be confined to substantially parallel beams and, as a result, no extraneous light will find its way into the end chambers where the photoelectric cells 40 and 41 are positioned. At this point it will be understood that the hood 12 is located directly over the chamber in which the light source 39 is positioned and, to provide for a free circulation of cooling air in this chamber, it is contemplated that the cabinet 10 will be provided with a screened opening near its bottom through which a circulation of cooling air may enter.

Upon referring to Figure 3 of the drawings, it will be seen that the shaft 36, which carries the operating crank 35 and the filter supporting members 37 and 38, is journaled between an end wall of the cabinet 10 and the chamber forming partition 46. As here shown, the filter supporting members 37 and 38 are fixed upon the shaft 36 so as to move therewith between two positions to bring light modifying filters carried thereby, as will hereinafter appear, into register with the light beams that are directed from the light source 39 upon the photoelectric cells 40 and 41. The filter supporting member 37 has grooved recesses into which filters 51 and 52 are positioned, and the filter supporting member 38 has similar grooved recesses into which filters 53 and 54 are positioned. In the preferred arrangement, the light modifying filters 51 and 53 will be of a type to provide an infra-red or near infra-red beam of light for the photoelectric cells 40 and 41, and the filters 52 and 54 will be capable of limiting the light beam projected from the light source 39 and falling upon the photoelectric cells 40 and 41 to a monochromic range of the visible spectrum. Preferably, because of their higher transmission value per unit of color, it is contemplated that the filters 52 and 54 will be of a character to provide a beam of colored light that is substantially within the blue range of the visible spectrum. In this figure of the drawings it will also be noted that the switch operating means 42 is connected at its end to a lever 55 that is also secured upon and is movable with the shaft 36 as the filter supporting members 37 and 38 are moved from one operative position to another.

In Figure 4 of the drawings there is shown a sample liquid containing vessel of a form which we prefer to use with our invention. As here illustrated, the vessel 50 comprises an elongated cylindrical portion having screw caps 56 and 57 at its ends that carry clear glass windows 58 between which the sample liquid is disposed and through which the light beam from the light source 39 is adapted to pass when the vessel 50 is in use. Extending upwardly from one side the vessel 50 has a rectangular extension 59 that communicates with the interior thereof and permits a complete filling of the cylindrical portion with a sample liquid. This extension 59 is provided at one end with a pouring spout 60 by means of which the sample liquid may be conveniently poured from the receptacle 50. In the measurement of color by the light absorption method, as contemplated by our present invention, it is well known that the amount of light transmitted through a sample will be dependent upon both the density of color of the liquid and also the length of the light path therethrough as it passes from the source of illumination to the associated photoelectric light sensitive cell and, therefore, in order to render our apparatus equally sensitive to extremely light, intermediate and moderately colored liquids, we contemplate the use of at least three liquid containing receptacles 50 which are of different lengths. In this respect we likewise proportion the lengths of these three receptacles so that their dimensions are even multiples of each other. For example, for use in measuring the color of extremely light colored liquids, we provide a vessel 50 having an overall length for the liquid path of 9 centimeters. For the intermediately colored liquids, we provide a vessel 50 having a dimension of 6 centimeters through the liquid, and for the moderately colored liquids, we may use a vessel 50 having an overall liquid light transmitting path of 3 centimeters. In this manner it will be possible to interpret the color readings of a sample taken with different lengths of liquid paths in terms of a length of the liquid path corresponding to another of the vessels by merely multiplying or dividing the results obtained with one or the other of the vessels by the factor which is determined by the difference in the lengths of the receptacles that are used. Since our invention is primarily intended for use in measuring the color of extremely light solutions, it is contemplated that the liquid containing receptacle having a dimension of 9 centimeters in length will be used under most circumstances. For solutions which contain an intermediate amount of coloring matter, it will be found that the medium length vessel having a dimension of 6 centimeters will be desirable, whereas, when the liquid under measurement is of a considerably more densely colored character, the liquid containing vessel 50 having a dimension of 3 centimeters will be found more desirable. The size of the sample liquid containing vessel 50 obviously does not limit the scope of this invention. However, the use of sample liquid containing vessels 50 of multiple increments in size has the advantage that color measurements taken with one of these vessels will be a direct multiple of the measurements obtainable with the liquid containing vessels of the other dimensions.

In Figures 5 and 6 of the drawings we have shown the scales 18 and 19 as mounted upon disc-like members 61 and 62 which also carry associated uniformly wound measuring resistances 63 and 64 at their peripheries. The disc-like members 61 and 62 are mounted upon suitable supports and they are movable by means of the control knobs 20 and 21 previously referred to as carried by the panel 14. When these disc-like members 61 and 62 are moved by the knobs 20 and 21, the calibrated scales thereupon will be moved relative to fixed indexes or pointers 65 and 66 that are provided in the apertures 16 and 17 of the panel 14 and, at the same time, the measuring resistances 63 and 64 will be moved relative to associated fixed contacts 67 and 68 that provide for an adjustable connection intermediate the ends of these measuring resistances. It will be understood that the ends of these measuring resistances 63 and 64 will be connected to the remaining portions of the measuring circuit through suitable flexible leads which will permit their movement as contemplated when the knobs 20 and 21 are operated to bring about a balance in the measuring circuits, as will hereinafter appear. In connection with the measuring resistances 63 and 64, it should be stated that they should be of the precision type uniformly wound so that when a total resistance of 100 ohms is calibrated in equal divisions ranging from zero to one hundred, the readings obtained thereby will be in percentage of the total resistance included in the measuring circuit. This is considered one of the novel features of the present device and is far superior to other arrangements wherein the readings are not directly related to the resistance. However, it will be understood that other types of measuring means, such as calibrated meters, may be employed without departing from the spirit of this invention. While we have suggested that the use of a measuring resistance of 100 ohms calibrated in equal divisions is practicable, it has been found that the graduations upon the calibrated scales 18 and 19 may be given a greater spread if an additional equal resistance is included in series with the measuring resistances 63 and 64. This is considered to be a novel aspect of the present invention and is a valuable feature in color measuring devices, as it provides a direct measure of the percent light transmission when a balanced circuit of the type to be described is employed. In determining the color of pale solutions, only about half of the measuring range of the resistance is required. Therefore, we propose, as will hereinafter appear, to connect an additional resistance of equal value in series with each of the measuring resistances 63 and 64. By this means the range of the measuring resistances and the graduations associated therewith will be doubled. In other words, a reading of twenty-five with the measuring resistance 63 or 64 alone will become a reading of fifty on the associated graduated scales when the additional fixed resistance referred to above is connected in series therewith. The resistance values of the measuring resistances 63 and 64 and the additional resistance units connected in series therewith will, of course, govern the exact amount of spread which will be possible on the graduated scales 18 and 19. This feature has many advantages, as the movement of the graduated scales for any particular reading will be approximately twice what it would be with one of the measuring resistances 63 or 64 alone and, consequently, an increased accuracy in the reading of the instrument will result. In such a modification care must be taken, however, not to use excessively high resistance shunt circuits across the photoelectric cells 40 and 41. This is important as the use of excessively high resistances in these cell circuits will cause the cells to depart from their straight line response which is so essential in a direct reading instrument of the type here proposed. We have found that a total shunt circuit of approximately 200 ohms may be used without appreciably affecting the straight line character of the cell response. As shown in Figure 5 of the drawings, the graduated scale 18, which is associated with the blue filters, comprises an outer series of graduations 69 that represent percent transmission, and an inner series of graduations 70 that are in −Log T units, which are the fundamental light transmission units as based on Beer's law. Similarly, as shown in Figure 6 of the drawings, the graduated scale 19, which is associated with the infra-red filters, has an outer series of graduations 71 that represent percent transmission, and an inner scale 72 which is in −Log T units. With these scales it will be seen that the results are not expressed upon an arbitrary or empirical basis and, therefore, the advantage of this type of scale should be obvious to those familiar with this art. Furthermore, the use of basic transmission units, as described, permits a conversion of the results taken with one length of sample to another length of sample, and from one concentration of color to another merely by a simple direct multiplying factor.

Reference is here again made to Figure 2 of the drawings for a more detailed description of the photoelectric measuring circuits and also the means associated therewith which renders the several circuits responsive to different light conditions as determined by the position of the light source modifying filters. In connection with this figure of the drawings, it will be noted that the proposed apparatus differs materially from other color measuring devices of the prior art in that it contemplates the use of only one absorption vessel. In other words, by our present invention we eliminate the use of a second vessel in which a standard of comparison, such as distilled water, is contained. The use of a single absorption vessel 50, as here proposed, has an advantage over the prior art devices in that it does not require the intermittent cleaning of such a vessel and the frequent replacing of the standard of comparison and, as a further and important result, this additional source of possible error, due to contamination of the standard of comparison, is entirely eliminated. As shown, the single sample containing vessel 50, which is used in accordance with our invention, is placed in the light path between the light source 39 and the photoelectric cell 41. To compensate for the omission of the second or standard of comparison containing vessel, we have discovered that an equivalent means for balancing the outputs of the photoelectric cells 40 and 41 can be obtained by the use of the aperture plate 48 which is so proportioned as to reduce the amount of light reaching the photoelectric cell 40 to a value which is equal to that which would occur were a second absorption vessel 50, containing a 100% transmission standard of comparison, interposed between the light source 39 and the photoelectric cell 40. In connection with this aperture, it has also been discovered that compensation may also be provided which will permit a difference in the distances between the source of light 39 and the two photoelectric cells 40 and 41 and, therefore, it is also possible to mount the photoelectric cell 40 nearer the source of light 39 and in this manner shorten the width of the cabinet 10.

As will now be explained, the photoelectric cells 40 and 41 are adapted to be connected in opposed series relation through independent cell shunting resistances of substantially equal value and between which the galvanometer circuit is adjustably connected to respond to the difference in the potentials developed by the respective cells when the different filter means are brought into operative relation with the light source. Essentially, the circuits here employed are, except for certain modifications, substantially similar to the circuits disclosed in the Holven and Gillett patents hereinbefore identified. The photo-generative cells 40 and 41 are shunted by fixed resistance circuits of substantially equal value and their like poles are connected together so that a condition of balance or unbalance may be indicated through the galvanometer circuit. In order to obtain an independent light transmission measurement at different wave lengths, the circuit here illustrated contemplates independent photoelectric cell shunting circuits for each wave length and the use of a novel switching arrangement that is adapted to complete measuring circuits that correspond to the particular filter means being employed at the time. To accomplish this change in the measuring circuits, our invention includes the further feature of a gang switch 73 having a plurality of two-position contacts 74, 75, 76, 77, 78 and 79. As shown, the gang switch 73 is connected to the filter supporting shaft 36 through the operating means 42 so that when the different filters upon the shaft 36 are brought into cooperating relation with the light source, the gang switch 73 will be operated to establish corresponding circuits for the effective filter means. At the same time, the contact 74 of the gang switch 73 will operate to connect the proper lamp 29 or 30 in the circuit to indicate which of the filter means and calibrated measuring resistances are in operation. An advantage of this arrangement is that it permits the use of a number of calibrated measuring resistances in connection with a corresponding number of light modifying filters. In the present instance the circuits are so arranged that when the infra-red filters 51 and 53 are in operation, the calibrated measuring resistance 64 will be connected in the shunt circuit of the photogenerative cell 40, and when the blue filters 52 and 54 are in their operative position, the calibrated measuring resistance 63 will be connected in the shunt circuit of the photo-generative cell 40. At the same time, the shunting circuit of the photo-generative cell 41 will be respectively completed through fixed resistances 74' and 75' with which adjustable contacts that are controlled by the operating knobs 22 and 23 are associated.

From the above it will be seen that the gang switch 73, because of its connection to the filter supporting shaft 36 through the switch operating means 42, will serve to automatically interlock the proper photoelectric cell shunting circuit and the galvanometer circuit with the corresponding filter means by a simple movement of the crank 35 to bring the desired filter means into operative relation. In this way a measurement of the total absorption of a sample may be obtained with the calibrated measuring resistance 63 when the blue filters 52 and 54 are brought into register with the light source 39, and then by merely operating the crank 35 to bring the infra-red filters 51 and 53 into register with the light source 39, as illustrated in Figure 2 of the drawings, it will be possible to obtain a measurement of the turbidity of the same sample without disturbing the position of the sample containing vessel 50 or the condition of the sample therein. This arrangement has the advantage that both the total absorption and the turbidity of a sample can be measured by the instrument at the same time. At this point it will be noted that the light source 39, which is in the form of an incandescent lamp, is adapted to be connected through conductors 80 and 81 to a power circuit formed by conductors 82 and 83 by means of a circuit controlling contact 84 which is operable by the key switch 28. In this way, when the key switch 28 is operated to close the galvanometer circuit, the light source 39 will also be energized. It will be understood that the circuit of the light source 39 may be controlled independently of the galvanometer switch, if desired. It will also be noted that the indicating lamps 29 and 30 upon the panel 14 are arranged so as to be connected to the source of power by conductors 85 and 86 with which the upper contact 74 of the gang switch 73 cooperates to determine which of these lamp circuits will be completed. When the infra-red filters 51 and 53 are in their operative positions, as here illustrated, the photoelectric cell 40 will be shunted by a circuit which includes a conductor 87, the measuring resistance 64, a conductor 88, the contact 77 of the gang switch 73 to a conductor 89, through a fixed resistance 90 and a conductor 91 to the other terminal of the photoelectric cell. At the same time, a shunting circuit for the photoelectric cell 41 will be established through a conductor 92 to the fixed resistance 74', a conductor 93 and through the contact 76 of the gang switch 73 to a conductor 94 which connects with the key switch 27 and thus by way of a conductor 95 through a fixed resistance 96 to conductors 97 and 98, the latter of which forms a fixed and permanent connection between like poles of the two photoelectric cells 40 and 41 and also completes the galvanometer circuit. Under these conditions, it will be noted that the galvanometer 15 will be connected to the relatively movable contact 68 of the measuring resistance 64 through a conductor 99 which connects with the contact 78 of the gang switch 73 and by way of a conductor 100 to one terminal of the galvanometer 15. The other terminal of the galvanometer 15 is shown as connected through a conductor 101 to a movable contact 102 of the key switch 28 and when this contact 102 is moved into its operative position, the galvanometer circuit will be completed through a conductor 103 to the contact 79 of the gang switch 73 and by way of a conductor 104 to a point adjustable along the resistance 74'. Now, if it is assumed that the crank 35 is pulled forward so as to bring the blue filters 52 and 54 into register with the light source 39, the shunt circuit of the photoelectric cell 40 will be completed through the conductor 87 to a conductor 105 and through the measuring resistance 63 to a conductor 106 which will then be engaged by the contact 77 of the gang switch 73 and back to the other terminal of the photoelectric cell 40, through the conductor 89, the fixed resistance 90 and the conductor 91. At the same time, the shunt circuit of the photoelectric cell 41 will be completed through the conductor 92 to the resistance 75', through a conductor 107 with which the contact 76 of the gang switch 73 will now cooperate, and by way of the conductor 94 through the key switch 27 to conductor 95, the resistance 96 and the conductor 97, to the conductor 98 and back to the other terminal of this cell. Under this latter condition, it will also be seen that due to the operation of the gang switch 73 by the movement of the crank 35, the circuit of the galvanometer 15 will now be completed from the relatively movable contact 67 of the measuring resistance 63 through a conductor 108 which, under the assumed conditions, will cooperate with the contact 78 of the gang switch 73, through the conductor 100 to one terminal thereof. The other terminal of the galvanometer will be completed through the conductor 101, the contact 102 of the key switch 28 to the conductor 103 and through the contact 79 of the gang switch 73, to a conductor 109 to a point adjustable along the resistance 75'.

In the above description of the photoelectric cell shunting and galvanometer circuits and the changes effected therein by an operation of the crank 35 to bring about the desired modification of the light source, it will be noted that the position of the key switch 27 has remained unchanged and this is as it should be. This key switch 27 has two positions, one of which, as shown, is used during all measuring operations. In its other position this key switch 27 is adapted to cut out the fixed resistance 96 and substitute therefore one or the other of a plurality of other resistance units, which will be later described, in the shunting circuit of the sample liquid influenced photoelectric cell 41. The operation of this key switch 27 makes no other change in remaining portions of the photoelectric measuring circuits. Before describing this aspect of our present disclosure, it should be explained that a novel feature of our present invention resides in the elimination of the use of a standard of comparison or reference solution when initially balancing the galvanometer circuits. In most devices of this character it is first necessary to balance the cell shunting circuits with two vessels containing a standard of comparison, such as distilled water, which are placed in the light beams of each of the photoelectric cells. While the present invention contemplates the use of only one such vessel which might, if filled with a standard of comparison such as distilled water, be inserted in the path of light reaching the photoelectric cell 41 to obtain a balance of the cell circuits, we have also avoided this requirement by providing compensating resistances of suitable value which can be temporarily connected in the shunting circuit of the photoelectric cell 41 to give the same condition of balance as would occur in the event that the vessel 50 were first filled with distilled water. Since our present disclosure contemplates the use of three sample containing vessels 50 of different lengths, and also a modification of the light source to render the photoelectric cells responsive to different regions of the spectrum, it is necessary to provide a group of resistances for each length of the vessel 50, and in each of these groups it is also necessary to provide a resistance having a compensating value which is proper for the particular filter which is in use at the time the balancing of the circuit is carried out. Therefore, as here illustrated, the jack receptacles 31, 32 and 33 are each shown as having two associated resistance units, both of which are adapted to be connected in the shunting circuit of the cell 41 by the insertion of the single jack 34. The jack receptacle 31 is shown as associated with resistance units 110 and 111. The jack receptacle 32 is associated with resistance units 112 and 113, and the jack receptacle 33 is associated with resistance units 114 and 115. At their other ends, the resistance units 110, 112 and 114 are shown as connected in common to a conductor 116 which is adapted to cooperate with the contact 75 of the gang switch 73 when the blue filters 52 and 54 are interposed between the light source 39 and the photoelectric cells 40 and 41. The corresponding ends of the resistance units 111, 113 and 115 are also connected in common to a conductor 117 which cooperates with the contact 75 of the gang switch 73, as shown, when the infra-red filters 51 and 53 are interposed between the light source 39 and the photoelectric cells 40 and 41. In this manner when the jack 34 is inserted in the jack receptacle 31, the resistance unit 111 will be connected in the shunt circuit of the photoelectric cell 41 by means of a conductor 118, the conductor 117, through the contact 75 of the gang switch 73, to a conductor 119, through an upper contact 120 of the key switch 27 and through conductor 94 to the contact 76 of the gang switch 73 and by way of conductor 93, through the resistance 74' and back to the other terminal of the photoelectric cell 41 through the conductor 92. This circuit, when thus established, will permit a balancing of the measuring circuit with the infra-red filters in operation without the interposition of the vessel 50 with distilled water or a standard of comparison in the light path of the photoelectric cell 41, and when the crank 35 is pulled forward to bring the blue filters 52 and 54 into operation, the resistance 110 will be connected into this circuit so that the same balancing operation may be carried out in connection with the blue filters. The advantages of this form of balancing will become more apparent when it is pointed out that different conditions will be established in the measuring circuit to produce a balance for each color filter and for each size of vessel 50. These auxiliary balancing resistances 110 to 115 inclusive each have a predetermined and proper resistance value that will, when connected in the circuit as described, reproduce conditions equivalent to that which would occur with each size sample vessel 50 and with each set of filters if the vessel 50 with a 100% transmission standard, such as distilled water, were first interposed in the path of the light beam reaching the photoelectric cell 41.

The operation of our device and mode of procedure for the measuring of the color and turbidity of a sample liquid will now be described. First, it will be necessary to adjust the color and turbidity measuring circuits so as to insure that the potential differences developed across the shunting circuits of the cells 40 and 41 are properly balanced with respect to a 100% transmission standard of comparison with each set of filters. Now, if it is assumed that a vessel 50 having a length of 9 centimeters is to be used for the sample, the jack 34 will be inserted in the jack receptacle 31. This will connect the resistances 110 and 111 in the balancing circuits. At the same time, the key switch 27 will be moved into its circuit balancing position, which will be the opposite of that illustrated in Figure 2 of the drawings. Under these conditions, with the gang switch 73 in the position shown, the key switch 27 will connect the auxiliary balancing resistance 111 in series with the resistance 74' as a shunt across the photoelectric cell 41. At this point it will be understood that the operation of the key switch 27 will not in any manner alter the shunt circuit of the photoelectric cell 40 which now includes the adjustable measuring resistance 64. With the shunt circuit of the photoelectric cell 41 thus established, the measuring resistance will be moved to bring the zero absorption and 100% transmission point of its graduated scale 19 into register with the index 66 of the aperture 17 and thus, with the entire measuring resistance 64 in the shunting circuit of the photoelectric cell 40, the adjustable connection along the resistance 74', as provided by the conductor 104, will be moved until the galvanometer 15 indicates a zero reading, or in other words, a balance between the potential differences developed across the shunting circuits of the cells 40 and 41. At this point it will be understood that the adjustment provided by the conductor 104 upon the resistance 74' will be controlled by the knob 23 previously described as provided upon the panel 14. This initial balancing operation will establish circuits by means of which the turbidity of the sample can be measured. In order, however, that the color and turbidity of the sample may be determined without disturbing the sample, it will be preferable to next operate the crank 35 to bring the blue filters into register with the light source.

When this has been done, the gang switch 73 will operate through its contacts 75 and 76 to connect the auxiliary balancing resistance 110 in series with the fixed resistance 75' as a shunt circuit for the photoelectric cell 41. At the same time, the gang switch 73 will also operate through its contact 77 to connect the fixed resistance 90 in series with the calibrated measuring resistance 63 as a shunt circuit for the photoelectric cell 40. Then, with the calibrated scale 18 of the measuring resistance 63 positioned with its zero absorption and 100% transmission graduation in register with the index 65 of the aperture 16, the galvanometer circuit can be adjusted to indicate a balance by an operation of the knob 22 which, as will be understood, controls the point of connection of the conductor 109 upon the fixed resistance 75'.

After the two measuring circuits have thus been balanced against the standard of comparison circuits established by the auxiliary resistances 110 and 111 by the operation of the key switch 27, as above outlined, the key switch 27 will be moved into its measuring circuit establishing position, as illustrated in Figure 2 of the drawings, and, as a result, the fixed resistance 96 will be substituted for the auxiliary measuring resistances 110 and 111 in the shunting circuit of the photoelectric cell 41. It will now be assumed that a sample of liquid has been prepared in a suitable vessel 50 and has been inserted in the position between the source of light 39 and the photoelectric cell 41. Under these conditions, the crank 35 will be pulled forward to bring the blue filters 52 and 54 into cooperating relation with the light source 39 and, at the same time, the contacts 74 to 79 of the gang switch 73 will be moved into their lower positions where the contact 74 thereof will establish a circuit for the blue indicating lamp 29 and connect the total absorption measuring resistance 63 in series with the fixed resistance 90 as a shunt circuit for the photoelectric cell 40, and simultaneously, the fixed resistance 96 will be connected in series with the resistance 75' as a shunt circuit for the photoelectric cell 41. Now, without disturbing the adjustment of the conductor 109 upon the fixed resistance 75', it will be possible to determine the total absorption of the sample liquid in the vessel 50 by moving the measuring resistance 63 relative to its fixed contact 67 until a balance is again indicated by the galvanometer 15. Then, the reading upon the graduated scale 18 will indicate the percent transmission of the sample, or the total absorption thereof in —Log T units. During these balancing operations, it will be understood that the key switch 28 will be held in its downward position so as to energize the light source 39 and also connect the galvanometer 15 in the measuring circuit. The downward movement of the key switch 28 will also serve to open a circuit formed by a conductor 121 which provides a short circuit across the terminals of the galvanometer 15 to prevent injury thereto when not in operation. After the reading thus determined by the position of the calibrated scale 18 with respect to the index 65 at the aperture 16 of the panel 14 has been obtained, the crank 35 will be operated in a reverse direction to bring the infra-red filters 51 and 53 into register with the light source 39 and the same balancing operation will be carried out by an adjustment of the turbidity measuring resistance 64 by an adjustment thereof with respect to its relatively movable contact 68 until a balance has been obtained in the galvanometer circuit for this condition of operation. This will bring a point upon the graduated scale 19 adjacent the index 66 at the aperture 17 of the panel 14 which will directly indicate the turbidity of the liquid under examination. With these two readings thus established at the apertures 16 and 17 upon the panel 14, it will be possible to determine the true color of the sample by merely subtracting the second or turbidity reading from the total absorption or color plus turbidity reading and in this way the true color of the sample will be indicated in a direct manner without reference to empirical tables or correction factors.

In Figures 7 and 8 of the drawings there is shown modifications of our invention by means of which the above subtraction operation may be carried out in a mechanical manner. As shown in Figure 7, the graduated scales 18 and 19, which are carried by the rotatable discs 61 and 62, are arranged side by side, and the aperture 16 is made somewhat longer in dimension. Associated with the aperture 16 there is also shown a sector-like member 122 which is freely movable upon the shaft which supports the disc 61. This sector-like member 122 is apertured and provides an additional index 123 that is adapted to cooperate with and move over the graduated scale 18 as the calibrated scale 19 is adjusted with respect to the index 66 to obtain a turbidity reading for the sample. In this manner it will be seen that after the scale 18 has been moved with respect to the index 65 to produce an indication of the total absorption of the sample, the index 123 upon the sector-like member 122 will be moved from this point along the calibrated scale 18 a distance corresponding to the amount of movement of the calibrated scale 19 necessary to produce an indication of the turbidity of the sample under inspection. This movement of the sector-like member 122 will be transmitted from the shaft which supports the disc 62 by means of a belt 124 which passes over pulleys 125 and 126, the latter pulley being carried by the sector-like member 122. Since the calibration of the scales 18 and 19, which respectively read in terms of total absorption and turbidity, are related to each other in the ratio of substantially 2:1, as will be explained and pointed out hereinafter, the ratio of the belt supporting pulleys 125 and 126 is likewise 2:1. Therefore, when the turbidity indicating scale 19 is moved a predetermined distance, the index 123 upon the sector-like member 122 will be moved a proper distance to subtract the value of the reading provided upon the scale 19 from the total absorption reading appearing upon the graduated scale 18 and, as a result, the position of the index 123 upon the graduated scale 18 will directly indicate the true color of the sample. In other words, the index 65 at the aperture 16 will indicate the total absorption, the index 66 at the aperture 17 will indicate the turbidity, and the index 123 of the sector-like member 122 will indicate upon the graduated scale 18 the corrected or true color of the sample liquid under measurement. In the modification of our invention illustrated by Figure 8 of the drawings, the sector-like member 122 is omitted and, therefore, since the operation to be performed is of a subtractive nature with respect to the calibrations upon the graduated scale 18, the belt 124 is shown as reversed so as to provide a subtractive or reverse movement of the calibrated scale with respect to its fixed index 65 and the pulley 126 is fixed upon the disc 61. At the same time, in order not to interfere with the free movement of each of the measuring resistances during the balancing and adjusting periods, the pulley 125, over which the belt 124 is passed, is made freely movable upon the shaft that supports the disc 62 and is arranged to be connected to this shaft at the proper time by a suitable cone clutch 127 which may be operated by an inward or outward movement of the knob 20 which controls the movement of the disc 62 upon which the turbidity indicating scale 19 is mounted. In this way it will be seen that the measuring resistance 63 with its associated calibrated scale 18 may be moved independently to determine the total absorption of the sample under test, as outlined above. Now, if it is assumed that the turbidity measuring circuit has been balanced and that the graduated turbidity indicating scale 19 is at zero with respect to its index 66, it will be seen that if the clutch 127 is brought into operation by a manipulation of the knob 20, as above indicated, the calibrated scale 18 will be moved simultaneously with any movement of the calibrated scale 19 until the latter scale is brought to its turbidity indicating position. During this simultaneous movement of the two discs 61 and 62, the calibrated scale 18, which originally indicated the total absorption of the sample, will be moved backward a distance corresponding to twice that which has occurred in bringing the calibrated scale 19 into its turbidity indicating position and, as a result, the final reading indicated upon the graduated scale 18 will be the true or corrected color of the sample under test and not the total absorption thereof.

While others have attempted to correct for the effect of turbidity in the photoelectric measurement of color, the principle and means of correction employed have not provided a true and accurate form of compensation. Therefore, the readings obtained have not been representative of either the color or the total light absorption of the sample under test. In other words, the methods and instruments of the prior art do not provide a fundamentally correct means of compensation, as they are based on two incorrect assumptions, the first being that a given unit of turbidity will produce the same percentage of light absorption with two different colored filters; and second, that the spectral characteristics of a red filter are such that color has no effect, but that the measured absorption taken with such a filter is due to turbidity alone. That these assumptions are incorrect will be clear from an examination of Figures 9 and 10 of the drawings. Figure 9 is a plot of the —Log T values of solutions containing different amounts of turbid matter with light at various wave lengths. These curves are based on actual measurements of such solutions and readily indicate the different slopes and, therefore, the different light absorption per unit of turbidity with light of different wave lengths. As illustrated, for example, at three parts of turbidity, the —Log T value for green light is approximately .042 and is .033 for red light. Therefore, the absorption per unit of turbidity for green light is .014 as compared to only .011 for red light. This figure of the drawings also clearly indicates a definite response due to turbidity with infra-red light and is a feature that to our knowledge has never before been utilized in the measurement of and compensation for turbidity, as contemplated by this disclosure. Upon further examination of these two figures of the drawings it will become clear why it is necessary to utilize infra-red light rather than visible light for securing a correct indication or compensation for turbidity. In Figure 10 it will be noted that visible color filters obviously respond in varying degrees to the presence of color and, therefore, the use of any one of these filters, such as green, yellow, red, etc., to provide for turbidity correction, will not result in a measurement of turbidity alone, but a measure of turbidity plus a partial effect of color (i. e. total light absorption, or color plus turbidity) for that particular wave length. As suggested above, we have found that the only filter which is unaffected by color is an infra-red filter and thus a measurement with such a filter will be that of turbidity alone. This graph is similar to that of Figure 9, but is plotted against parts color instead of parts turbidity. These curves are also based on actual determinations. It will be noted that all light colored solutions absorb light at practically any wave length in the visible spectrum. Therefore, any visible light selected to give a measure of turbidity alone will not do this altogether, but will be affected to some extent by the color. For this reason, as noted above, measurements with red light do not give an indication of turbidity alone, but do give a measurement of turbidity plus color. An inspection of this latter figure of the drawings will also illustrate the reasons for our selection of a color filter of short wave length, such as is the case with blue light which, as previously indicated, provides a greater response per unit of color and, therefore, a greater sensitivity is possible in determining the total absorption measurement of the liquid.

Reference is now made to Figure 11 of the drawings, wherein there is graphically shown the relationship between the transmission measurements of a sample at the two different wave lengths of light employed with our device. This graph, which is essentially a plot of the —Log T blue values as abscissae, and the —Log T infra-red values as ordinates, more clearly explains how a correction for the turbidity of pale solutions can be obtained in a direct manner with this device. Each horizontal line represents a different turbidity value, while each sloping line represents a different color value. For purposes of illustration, assume a —Log T blue reading of .16 and a —Log T infra-red reading of .00. This means that the sample has zero turbidity and that the —Log T blue reading is entirely due to color. That is, the total absorption and the color of the sample are identical and there is, therefore, no correction for turbidity. Now, assume that turbid matter equivalent to a —Log T infra-red of .02 is added to this same solution without changing its original color. Obviously, the total absorption or —Log T blue reading of the sample will increase. This amounts to a change from .16 to .20, as may be observed from the graph. Now, in order to obtain the true color of the solution, some correction must be applied to the —Log T blue reading of .20. It is apparent in this example that the necessary correction which must be applied is .04, i. e., .20 minus .16, in order to obtain the true color of .16. While the —Log T infra-red reading does not indicate .04 but only .02, it has been discovered that this is a direct ratio of 2.0, i. e., .04/.02. In other words, the correction that must be applied to the total absorption is 2 times the —Log T infra-red reading. Expressed as a formula, this becomes:

True or corrected color = —Log T blue —2.0 (—Log T infra-red). It has been further determined that this same relationship exists throughout the range of color and turbidity changes. Obviously, a different relationship would exist with the use of other color filters. For example, the ratio factor for the green and infra-red filters shown in Figures 9 and 10 would be 1.64 instead of 2.0. Other factors would be used with other filter combinations. In considering this relationship, this ratio has been recognized in the development of this invention and the measuring resistances have been calibrated so that they are direct reading in character and, therefore, the above formula is not required. To obtain the true color, a simple subtraction of the turbidity from the total absorption reading is all that is necessary. This is considered one of the novel characteristics of our device.

It should be understood that other arrangements known to the art may be used to avoid the necessity of applying this ratio factor to the two measuring resistance calibrations. For example, a masking plate with an aperture of reduced size may be used in conjunction with each of the blue color filters. Such a masking plate would reduce the amount of blue light to correspond to that of the infra-red light so that the photoelectric cells 40 and 41 would respond equally for a given amount of turbidity. With the utilization of other filters, the size of the aperture in the masking plate would be changed to correspond with the characteristics of the particular filters used. This has certain advantages over the ratio factor in calibrating the two measuring resistances separately and should be considered as part of this invention.

In order to show that the corrected —Log T blue represents the correct color of a solution, Figure 12 is included. This is a plot of corrected —Log T blue readings against actual parts color and shows that this is a straight line relationship.

A further modification of our invention that may be employed is illustrated in Figures 13 and 14 of the drawings. Upon comparing the showing of Figure 13 with the showing of Figure 2 of the drawings, it will be seen that, except for the omission of the gang switches 76, 77, 78 and 79 and the elimination of one of the calibrated measuring resistances and its corresponding balance adjusting resistance, the apparatus and circuit arrangements are identical. Therefore, in describing this modification, reference will be limited in general to those features which differ from the arrangement as previously described. In this description, where previously described elements or conductors are referred to, the designating numerals previously employed will be retained.

As in the previously described arrangement, the photo-generative cell 40 is provided with a closed shunt circuit across its terminals in which there is provided a calibrated measuring resistance, and the photo-generative cell 41 is provided with a similar closed shunting circuit across its terminals in which there is provided a balance adjusting resistance comparable to and corresponding in resistance value to the calibrated measuring resistance in shunt with the photo-generative cell 40. Connected between this latter resistance unit and a point adjustable along the calibrated measuring resistance, there is a galvanometer circuit, including a galvanometer, which is adapted to be adjusted along the calibrated measuring resistance to indicate when the potentials developed by the cells 40 and 41 in the included portions of the calibrated measuring resistance and the balance adjusting resistance in the shunt circuit of the photo-generative cell 41 are equal. As shown, one terminal of the photo-generative cell 40 is connected through the conductor 87 to a calibrated measuring resistance 128 and through a conductor 129 to the fixed resistance 90 and back through the conductor 91 to the other terminal of the cell 40. This circuit includes the fixed resistance 90 and the calibrated measuring resistance 128 and forms a closed shunt circuit across the terminals of the photo-generative cell 40. A similar closed shunt circuit is formed across the terminals of the photo-generative cell 41. This latter shunting circuit includes the fixed resistance 96 and a balance adjusting resistance 130 and is completed from one terminal of the cell 41 through the conductor 92 to the balance adjusting resistance 130 and through a conductor 131 and the switch 27 to the conductor 95 and through the fixed resistance 96 to the conductor 98 and thus back to the other terminal of the photo-generative cell 41.

Similarly, the circuit which includes the balance indicating galvanometer 15 is shown as connected between points adjustable along the calibrated measuring resistance 128 and the balancing resistance 130. This circuit includes a relatively movable contact 132 that cooperates with the calibrated measuring resistance 128 and a conductor 133 which connects with one side of the galvanometer 15. The other side of the galvanometer 15 is shown as connected through the conductor 101 and the contact 102 of the switch 28 to a conductor 134 which connects with the balance adjusting resistance 130. As has been previously described, when the switch 28 is in its "off" position, as illustrated, it completes a shunting circuit 121 that prevents damage to the galvanometer 15, and when in its lower or operating position, its contact 84 completes an energizing circuit from the power circuit conductors 82 and 83 through conductors 80 and 81 for the light source 39.

As shown in Figure 14 of the drawings, the calibrated measuring resistance 128 is mounted upon a disc-like support 135 so that it can be moved relative to the contact 132 which is here illustrated as stationary. Associated with the resistance 128 and in proper relation therewith, the disc-like support 135 is provided with two calibrated scales, the inner one of which, designated by the numeral 136, is in terms of absorption due to turbidity and is used when the infra-red filters 51 and 53 are in operation between the light source 39 and the photo-generative cells 40 and 41. The other one of these graduated scales, designated by the numeral 137, is in terms of total light absorption and is used when the blue filter means 52 and 54 are in operation between the light source 39 and the photo-generative cells 40 and 41. A third graduation, designated by the numeral 138, is in terms of percentage of the total resistance which also includes the resistance 90 in the shunt circuit of the photo-generative cell 40.

In the operation of this embodiment of the invention it will be seen that when the adjustable contact 132 is positioned at the zero indicating point of the calibrated measuring resistance 128 and with the switch 27 in its upper or cell output balancing position, the galvanometer circuit 15 can be brought into balance by adjusting the conductor 134 along the balance adjusting resistance 130 in a manner similar to that previously described. Then, after a balance has thus been established in the galvanometer circuit and the switch 27 is moved into its lower or measuring position, as shown, the contact 132 can be adjusted relative to the calibrated measuring resistance 128 to obtain an indication upon the graduated scale 136 of the absorption of the sample liquid due to turbidity alone when the filters 51 and 53 are in their operating position, as illustrated. After making note of this indication, the filter means 52 and 54 can be moved into their light controlling position with respect to the light source 39 by an operation of the crank 35. Then, with the switch 27 in its circuit balancing position and the adjustable contact 132 in its zero indicating position upon the calibrated measuring resistance 128, the output of the photo-generative cells 40 and 41 can again be brought to a balance in the galvanometer circuit by a subsequent adjustment of the conductor 134 along the balance adjusting resistance 130. After this latter balancing adjustment has been made in the galvanometer circuit, the switch 27 can again be moved to its lower or measuring position and a reading of the total light absorption, due to both color and turbidity of the sample, will be indicated upon the calibrated scale 137 when the contact 132 is adjusted along the measuring resistance 128 to a point where the galvanometer circuit is again in a balanced condition. With the two readings thus obtained, it will be possible, by subtracting the former light absorption indication, which is due to turbidity, from the latter indication, which is the total absorption due to color and turbidity, to determine the true color of the sample.

Other variations of our invention may be made without departing from the spirit or scope of this invention. For example, in place of the lamp and scale galvanometer which we prefer because of its sensitivity, a direct current pointer type galvanometer could be employed without affecting the results obtained. As mentioned previously, we prefer the type of absorption vessel shown. However, this may also take a number of shapes and forms, provided that the light path through the solution is of sufficient length to effectively absorb the light. Other variations include the use of different means for moving the color filters into the path of the light beam.

While we have, for the sake of clearness and in order to disclose the invention so that the same can be readily understood, described and illustrated specific devices and arrangements, we desire to have it understood that this invention is not limited to the specific means disclosed, but may be embodied in other ways that will suggest themselves to persons skilled in the art. For example, since the resistances 14' and 15' are of equal value, a single resistance unit might be used at this point. It is believed that this invention is new and all such changes as come within the scope of the appended claims are to be considered as part of this invention.

Having thus described our invention, what we claim and desire to secure by Letters Patent is:

1. In a photoelectric measuring device for measuring the color of a liquid, the combination of a pair of photo-generative cells, a source of illumination adapted to project beams of light of equal intensity upon said photo-generative cells, a filter means adapted to limit said light beams to a monochromatic region of the visible light spectrum, a second filter means adapted to limit said light beams to the infra-red region of the spectrum, means for supporting a sample of liquid the color of which is to be measured between said source of light and one of said photo-generative cells, means for interchangeably supporting said filter means, whereby the light beam reaching said cell through the first of said above filter means will be modified by the color and turbidity of said liquid and the light beam reaching said cell through said second filter means will be modified by the turbidity alone of said liquid, a measuring means adapted to be connected to said photoelectric cells when said first filter means is in use to indicate the total light absorption of said sample liquid when the first of said filter means is in operation, a second measuring means adapted to be connected to said photoelectric cells when said second filter means is in use to indicate the turbidity of said sample liquid when the second of said filter means is in operation, and means responsive to the interchange of said filter means whereby the proper measuring means will be connected to said photoelectric cells when the corresponding filter means is in operation.

2. In a photoelectric measuring device for measuring the color of a liquid, the combination of a pair of photo-generative cells, a source of illumination adapted to project beams of light of equal intensity upon said photo-generative cells, a filter means adapted to limit said light beams to a monochromatic region of the visible light spectrum, a second filter means adapted to limit said light beams to the infra-red region of the spectrum, means for supporting a sample of liquid the color of which is to be measured between said source of light and one of said photo-generative cells, means for interchangeably supporting said filter means, whereby the light beam reaching said cell through the first of said above filter means will be modified by the color and turbidity of said liquid and the light beam reaching said cell through said second filter means will be modified by the turbidity alone of said liquid, a measuring means including a calibrated resistance and an adjustable contact adapted to be connected to said photoelectric cells when said first filter means is in use to indicate the total light absorption of said sample liquid when the first of said filter means is in operation, a second measuring means including a calibrated resistance and an adjustable contact adapted to be connected to said photoelectric cells when said second filter means is in use to indicate the turbidity of said sample liquid when the second of said filter means is in operation, and means responsive to an adjustment of said latter measuring means for changing the total absorption indication obtained by said first measuring means as said second measuring means is adjusted to indicate the turbidity of said sample liquid, whereby the true color of said sample liquid will be indicated by said first measuring means.

3. In a photoelectric measuring device for measuring the color of a liquid, the combination of a pair of photo-generative cells, a source of illumination adapted to project beams of light of equal intensity upon said photo-generative cells, a filter means adapted to limit said light beams to a substantially monochromatic region of the visible light spectrum, a second filter means adapted to limit said light beams to the infra-red region of the spectrum, means for supporting a sample of liquid the color of which is to be measured between said source of light and one of said photo-generative cells, means for interchangeably supporting said filter means, whereby the light beam reaching said cell through the first of said above filter means will be modified by the color and turbidity of said liquid and the light beam reaching said cell through said second filter means will be modified by the turbidity alone of said liquid, a measuring means including a calibrated resistance and an adjustable contact adapted to be connected to said photoelectric cells when said first filter means is in use to indicate the total light absorption of said sample liquid when the first of said filter means is in operation, a second measuring means including a calibrated resistance and an adjustable contact adapted to be connected to said photoelectric cells when said second filter means is in use to indicate the turbidity of said sample liquid when the second of said filter means is in operation, means responsive to an interchange of said filter means whereby the proper measuring means will be connected to said photoelectric cells when the corresponding filter means is in operation, and means connecting the adjustable contacts of said first and second measuring means for changing the total absorption indication obtained by said first measuring means as the contact of said second measuring means is adjusted to indicate the turbidity of said sample liquid, whereby the true color of said sample liquid will be indicated by said first adjustable measuring means.

4. In a photoelectric measuring device for measuring the color of a liquid, the combination of a pair of photo-generative cells, a source of illumination adapted to project beams of light of equal intensity upon said photo-generative cells, a filter means adapted to limit said light beams to a substantially monochromatic region of the visible light spectrum, a second filter means adapted to limit said light beams to the infra-red region of the spectrum, means for supporting a sample of liquid the color of which is to be measured between said source of light and one of said photo-generative cells, means for interchangeably supporting said filter means, whereby the light beam reaching said cell through the first of said above filter means will be modified by the color and turbidity of said liquid and the light beam reaching said cell through said second filter means will be modified by the turbidity alone of said liquid, an adjustable measuring circuit adapted to be connected to said photoelectric cells having a graduated scale and pointer associated therewith to indicate the total light absorption of said sample liquid when the first of said filter means is in operation, a second adjustable measuring circuit adapted to be connected to said photoelectric cells having a graduated scale and pointer associated therewith to indicate the turbidity of said sample liquid when the second of said filter means is in operation, and means for automatically changing the relative positions of the scale and pointer of said first measuring circuit as said second measuring circuit with its associated scale and pointer is adjusted to determine the turbidity of said sample liquid, whereby the true color of said sample liquid will be indicated by the graduated scale and pointer of said first adjustable measuring circuit.

5. In a photoelectric measuring device for measuring the color and turbidity of a liquid, the combination of a pair of photo-generative cells, a source of illumination adapted to project beams of light of equal intensity upon said photo-generative cells, a filter means adapted to limit said light beams to a monochromatic region of the visible light spectrum, a second filter means adapted to limit said light beams to the infra-red region of the spectrum, means for supporting a sample of liquid the color of which is to be measured between said source of light and one of said photo-generative cells, whereby the light beam reaching said cell through the first of said above filter means will be modified by the color and turbidity of said liquid and the light beam reaching said cell through said second filter means will be modified by the turbidity alone of said liquid, a shunt circuit connected across the terminals of one of said cells having two selectively connectible calibrated measuring resistances one of which is calibrated in terms of total absorption due to the color and turbidity of the liquid and the other of which is calibrated in terms of turbidity, a second shunt circuit connected across the terminals of the other of said cells having a resistance corresponding to said calibrated measuring resistances, a galvanometer circuit adapted to be connected between a point adjustable along either one of said calibrated measuring resistances in the first of said shunt circuits and a point adjustable along said corresponding resistance in the other of said shunt circuits, and means for alternately bringing said first and second filter means into operation and simultaneously completing the shunting circuits of said cells and connecting said galvanometer circuit between the one of said calibrated measuring resistances corresponding to the filter means in operation and said corresponding resistance in the other of said shunt circuits, whereby said device will operate to indicate the total light absorption of said liquid due to color and turbidity upon one of said calibrated measuring resistances and the turbidity alone of said liquid upon the other of said calibrated measuring resistances when said galvanometer circuit is adjusted upon said measuring resistances to produce a balance in the galvanometer circuit under the different light conditions as determined by said filter means.

6. In a photoelectric measuring device for measuring the color and turbidity of a liquid, the combination of a pair of photo-generative cells, a source of illumination adapted to project beams of light of equal intensity upon said photo-generative cells, a filter means adapted to limit said light beams to a substantially monochromatic region of the visible light spectrum, a second filter means adapted to limit said light beams to the infra-red region of the spectrum, means for supporting a sample of liquid the color of which is to be measured between said source of light and one of said photo-generative cells, whereby the light beam reaching said cell through the first of said above filter means will be modified by the color and turbidity of said liquid and the light beam reaching said cell through said second filter means will be modified by the turbidity alone of said liquid, a shunt circuit connected across the terminals of one of said cells having two selectively connectible calibrated measuring resistances one of which is calibrated in terms of total absorption and the other of which is calibrated in terms of turbidity, a second shunt circuit connected across the terminals of the other of said cells having connectible resistances corresponding to each of said calibrated measuring resistances, a galvanometer circuit adapted to be connected between a point adjustable along the one of said calibrated measuring resistances in the first of said shunt circuits and a point adjustable along the corresponding resistance in the other of said shunt circuits, and means for alternately bringing said first and second filter means into operation and simultaneously completing the shunting circuits of said cells and connecting said galvanometer circuit between one or the other of said calibrated measuring resistances depending upon which of the filter means is in use and its corresponding resistance in the other of said shunt circuits, whereby said device will operate to indicate the total light absorption of said liquid upon one of said calibrated measuring resistances and the turbidity of said liquid upon the other of said calibrated measuring resistances when said galvanometer circuit indicates a balance in the measuring circuits of said cells under the different light conditions as determined by the position of said filter means.

7. In a photoelectric device for measuring the true color of a liquid by the absorption method, the combination of a pair of photo-generative cells, a single source of light for simultaneously exciting said cells, filter means adapted to be positioned between each of said cells and said source of light to provide light beams of a definite visible color for exciting said cells, a second filter means adapted to be positioned between said source of light and said cells adapted to provide infra-red light beams for exciting said cells, a sample liquid containing vessel interposed between said filter means and one of said cells, a filter means position controlling means for alternately bringing said first and second filter means into operative relation with said source of light, a shunting resistance circuit connected across the output terminals of one of said photo-generative cells, a shunt forming circuit for the other of said photo-generative cells including a measuring resistance calibrated in terms of total absorption due to the color and turbidity of the sample liquid, a second shunt forming circuit for said latter photo-generative cell having a measuring resistance calibrated in terms of absorption due to the turbidity of the sample liquid, a circuit including a galvanometer adapted to be selectively connected between the shunting resistance across said first photo-generative cell and a point adjustable along said resistance calibrated in total absorption units or a point adjustable along said resistance calibrated in turbidity absorption units to indicate a condition of balance between the potential differences created in said shunting resistance and said first or second shunt forming circuits by said cells when said different filter means are in operation, and a circuit changing means associated with said filter position controlling means for connecting the related shunt forming circuits and said galvanometer circuit to said photo-generative cells as determined by the particular filter means interposed between said source of light and said cells.

8. In a photoelectric color measuring device of the absorption type, the combination of a pair of opposed photoelectric cells having shunting circuits with resistances therein connected across their terminals and between which a galvanometer circuit is adjustably connected to indicate a condition of balance between the potentials created in said shunting circuits by said cells, a single source of illumination adapted to project light beams of equal intensity upon said cells, a single vessel containing a liquid the color of which is to be measured interposable between said source of illumination and one of said cells, an auxiliary resistance having a potential drop corresponding to the difference in potentials generated by said cells when said vessel containing a standard of comparison is interposed in the light beam of said latter cell, and means for temporarily connecting said auxiliary resistance in the shunting circuit of said latter cell, whereby the potentials generated by said cell circuits may be initially balanced through said galvanometer circuit without placing said vessel and standard of comparison in the light beam of the other of said cells.

9. In a photoelectric color measuring device of the absorption type, the combination of a pair of opposed photoelectric cells having shunting circuits connected across their terminals and with resistances therein between which a galvanometer circuit is adjustably connected to indicate a condition of balance between the potentials created in said shunting circuits by said cells, a single source of illumination adapted to project light beams of equal intensity upon said cells, a plurality of filter means for limiting said light beams to different regions of the spectrum, a single vessel containing a liquid the color of which is to be measured interposable between said source of illumination and one of said cells, a plurality of auxiliary resistances each having a potential drop corresponding to the difference in potentials created by said cells when exposed to said light beam as limited by said filter means when said vessel containing a standard of comparison is interposed in the light beam of said latter cell, and means for changing said filter means and temporarily connecting a corresponding auxiliary resistance in the shunting circuit of said latter cell, whereby the potentials created by said cell circuits may be initially balanced through said galvanometer circuit under the different light conditions as determined by said filter means without placing said vessel and standard of comparison at any time in the light beam of the other of said cells.

10. In a photoelectric absorption type color measuring device, the combination of a pair of opposed photoelectric cells having shunting circuits connected thereto and with resistances therein between which a galvanometer circuit is adjustably connected to indicate a condition of balance between the potentials created in said shunting circuits by said cells, a single source of illumination adapted to project light beams of equal intensity upon said cells, a plurality of vessels having different lengths for containing a liquid the color of which is to be measured individually interposable between said source of illumination and one of said cells, auxiliary resistances each having a potential drop corresponding to the difference in potentials created by said cells when one of said vessels containing a standard of comparison is interposed in the light beam of said latter cell, and means for selectively connecting said auxiliary resistances in the shunting circuit of said latter cell, whereby the potentials created in said cell circuits may be initially balanced through said galvanometer circuit without placing one of said vessels with a standard of comparison in the light beam of the latter of said cells.

11. In a photoelectric color measuring device of the character described, the combination of an adjustable slidewire resistance having an index and a scale graduated in absorption units upon which the light absorption of a sample liquid will be indicated, a second adjustable slidewire having an index and a scale graduated in similar absorption units, said indexes and graduated scales being arranged adjacent each other, means for adjusting the relative position of said first index and graduated scale to indicate the light absorption of a sample liquid due to color and turbidity under one condition of operation, means for adjusting the relative position of said second index and graduated scale to indicate the light absorption of the sample liquid due to turbidity under another condition of operation, and means forming an operating connection between said first and second indexes and graduated scales operable when said first index and graduated scale have been adjusted to indicate the total light absorption of a sample liquid to automatically change the indicating adjustment of said first index and graduated scale as said second index and graduated scale are adjusted to indicate the absorption of the sample liquid due to turbidity, whereby the final position of said first index relative to said first graduated scale will provide a substantially true indication of the color alone of the sample liquid.

12. In a photoelectric color measuring device of the character described, the combination of a supporting panel having two spaced sight apertures formed therein, a stationary index associated with each of said sight apertures, an adjustable scale graduated in absolute absorption units adapted to move relative to the index associated with one of said sight apertures, a second adjustable scale graduated in similar absorption units adapted to move relative to the index associated with the other of said sight apertures, means for adjusting the relative position of said first graduated scale with respect to its associated index to indicate the light absorption of a sample due to its color and turbidity, means for adjusting the relative position of said second graduated scale with respect to its associated index to indicate the light absorption of the sample due to its turbidity, a movable index superimposed upon said first graduated scale and visible through said first aperture, and means forming a driving connection between said movable index and said second graduated scale adapted to move said movable index simultaneously with the adjustment of said second graduated scale with respect to its associated index, whereby said movable index will indicate upon said first graduated scale the light absorption of the sample which is due to its color alone.

13. In a photoelectric measuring device for measuring the color and turbidity of a liquid, the combination of a pair of photo-generative cells, a source of illumination adapted to project beams of light of equal intensity upon said photo-generative cells, a filter means adapted to limit said light beams to a definite color region of the visible light spectrum, a second filter means adapted to limit said light beams to the infra-red region of the spectrum, means for supporting a sample of liquid the color of which is to be measured between said source of light and one of said photo-generative cells, whereby the light beam reaching said cell through the first of said above filter means will be modified by the color and turbidity of said liquid and the light beam reaching said cell through said second filter means will be modified by the turbidity alone of said liquid, a shunt circuit connected across the terminals of one of said cells having selectively connectible calibrated measuring resistances one of which is calibrated in terms of total absorption due to the color and turbidity of the liquid and the other of which is calibrated in terms of turbidity, a second shunt circuit connected across the terminals of the other of said cells having a resistance corresponding to said calibrated measuring resistances, a galvanometer circuit adapted to be connected between a point adjustable along either one of said calibrated measuring resistances in the first of said shunt circuits and a point along said corresponding resistance in the other of said shunt circuits, the calibrations of said measuring resistances being graduated in accordance with the transmittance ratio existing between said filters, whereby the true color of the sample may be determined in a direct manner by subtracting the reading indicated by said second measuring resistance from the reading indicated by said first measuring resistance.

14. In a photoelectric measuring device for measuring the color and turbidity of a liquid, the combination of a pair of photo-generative cells, a source of illumination adapted to project beams of light of equal intensity upon said photo-generative cells, a filter means adapted to limit said light beams to a known color region of the visible light spectrum, a second filter means adapted to limit said light beams to the infra-red region of the spectrum, means for supporting a sample of liquid the color of which is to be measured between said source of light and one of said photo-generative cells, whereby the light beam reaching said cell through the first of said above filter means will be modified by the color and turbidity of said liquid and the light beam reaching said cell through said second filter means will be modified by the turbidity alone of said liquid, a shunt circuit connected across the terminals of one of said cells having two selectively connectible calibrated measuring resistances one of which is calibrated in terms of total absorption and the other of which is calibrated in terms of turbidity, the calibration of said measuring resistances being graduated in accordance with the total light transmittance ratio existing between said filters, a second shunt circuit connected across the terminals of the other of said cells having a resistance corresponding to each of said calibrated measuring resistances, a galvanometer circuit adapted to be connected between a point adjustable along either one of said calibrated measuring resistances in the first of said shunt circuits and the corresponding resistance in the other of said shunt circuits, and means for alternately bringing said first and second filter means into operation and simultaneously completing the corresponding shunting circuits of each of said cells and connecting said galvanometer circuit between one or the other of said calibrated measuring resistances and the corresponding resistance in the other of said shunt circuits, whereby said device will operate to indicate in equivalent terms the total light absorption of said liquid upon one of said calibrated measuring resistances and the turbidity of said liquid upon the other of said calibrated measuring resistances when said galvanometer circuit between the shunt circuits of said cells is in balance under the different light conditions as determined by the choice of said filter means.

15. In a photoelectric measuring device for measuring the color and turbidity of a liquid, the combination of a pair of photo-generative cells, a source of illumination adapted to project beams of light of equal intensity upon said photo-generative cells, a filter means adapted to limit said light beams to the blue region of the visible light spectrum, a second filter means adapted to limit said light beams to the infra-red region of the spectrum, means for supporting a sample of liquid the color of which is to be measured between said source of light and one of said photo-generative cells, whereby the light beam reaching said cell through the first of said above filter means will be modified by the color and turbidity of said liquid and the light beam reaching said cell through said second filter means will be modified by the turbidity alone of said liquid, a shunt circuit connected across the terminals of one of said cells having two selectively connectible calibrated measuring resistances one of which is calibrated in terms of total absorption and the other of which is calibrated in terms of turbidity, the calibration of said measuring resistances being graduated respectively in numerical values having a ratio of 2:1, a second shunt circuit connected across the terminals of the other of said cells having a resistance corresponding to said calibrated measuring resistances, a galvanometer circuit adapted to be connected between a point adjustable along either one of said calibrated measuring resistances in the first of said shunt circuits and a point along said corresponding resistance in the other of said shunt circuits, and means for alternately bringing said first and second filter means into operation and simultaneously completing the corresponding shunting circuits of each of said cells and connecting said galvanometer circuit between one or the other of said calibrated measuring resistances and its corresponding resistance in the other of said shunt circuits, whereby said device will operate to indicate in equivalent terms the total light absorption of said liquid upon one of said calibrated measuring resistances and the turbidity of said liquid upon the other of said calibrated measuring resistances when said galvanometer circuit indicates a balance between the potentials created in said shunt circuits by said cells under the different light conditions as determined by said filter means in operation.

16. In a photoelectric device for measuring the color of a liquid by the absorption method, the combination of a pair of photo-generative cells, a source of light adapted to project beams of light upon said photo-generative cells, filter means interposable between said source of light and each of said cells adapted to limit said light beams to a monochromic region of the visible spectrum, a second filter means interposable between said source of light and said cells adapted to limit said light beams to the infra-red region of the spectrum, means for supporting a sample liquid the color of which is to be measured in the light beam reaching one of said cells, means modifying the light beam reaching the other of said cells to correspond to the light absorption of a standard of comparison, a measuring circuit for determining the difference in the potentials developed by said cells when said first filter means is interposed between said source of light and said cells, a second measuring circuit for determining the difference in the potentials developed by said cells when said second filter means is interposed between said source of light and said cells, and an indicating scale graduated in terms of total absorption associated with each of said measuring circuits, one of said scales being calibrated relative to the light transmission characteristic of said monochromic filter means and the other of said scales being calibrated relative to the light transmission characteristic of said infra-red filter means, whereby the measurements indicated upon said scales will be in similar terms of the standard of comparison and subtractive to indicate the true color of the sample.

17. In a photoelectric device for measuring the color of a liquid by the absorption method, the combination of a pair of photo-generative cells, a source of light adapted to project beams of light upon said photo-generative cells, filter means interposable between said source of light and each of said cells adapted to limit said light beams to a monochromic region of the visible spectrum, a second filter means interposable between said source of light and said cells adapted to limit said light beams to the infra-red region of the spectrum, means for supporting a sample liquid the color of which is to be measured in the light beam reaching one of said cells, a measuring circuit for determining the difference in the potentials developed by said cells when said filter means is interposed between said source of light and said cells, and means for modifying the intensity of the light beam reaching the other of said cells by an amount corresponding to what would be the light absorption of a standard of comparison.

18. In a two cell light absorption color measuring device, the combination of first and second photo-generative cells, a light source disposed between said cells, a separate shunt circuit connected across the terminals of each of said cells, said shunt circuits being of equal resistance value, a galvanometer circuit connected between said shunt circuits to indicate when a balance exists between the potentials developed by said cells in their respective shunt circuits, light beam controlling means for limiting the light beam directed upon the first of said cells to a value corresponding to that which would be produced by the interposition of a standard of comparison, and means for limiting the output of said second cell, comprising a resistance insertable in the shunt circuit of said second cell having a value corresponding to the decrease in potential which would occur in said second cell output were a standard of comparison inserted between said source of light and said second cell.

19. In a two cell light absorption color measuring device, the combination of first and second photo-generative cells, a light source disposed between said cells, a separate shunt circuit connected across the terminals of each of said cells, said shunt circuits being of equal resistance value, a galvanometer circuit connected between said shunt circuits to indicate when a balance exists between the potentials developed by said cells in their respective shunt circuits, means for limiting the light beam directed upon the first of said cells to a value corresponding to that which would be produced by the interposition of a standard of comparison comprising a partition between said cell and said light source having a restricted light beam controlling aperture, and means for limiting the output of said second cell, comprising a resistance insertable in the shunt circuit of said second cell having a value corresponding to the decrease which would occur in said cell output were a standard of comparison inserted between said source of light and said second cell.

20. In a photoelectric device for measuring the color of solutions by the absorption method, the combination of a pair of photo-generative cells, a source of illumination adapted to project beams of light of equal intensity upon said photo-generative cells, filter means interposable between said source of illumination and each of said cells adapted to limit said light beams to a monochromic region of the visible spectrum, a second filter means interposable between said source of illumination and said cells adapted to limit said light beams to the infra-red region of the spectrum, means for supporting a sample liquid the color of which is to be measured in the light beam reaching one of said cells, means modifying the light beam reaching the other of said cells to correspond to the light absorption of a standard of comparison, an adjustable measuring circuit for determining the difference in the potentials developed by said cells when either of said filter means is interposed between said source of illumination and said cells, and a dual indicating scale associated with said measuring circuit having two scales each of which is graduated in terms of total absorption, one of said scales being calibrated relative to the light transmission characteristic of said monochromic filter means and the other of said scales being calibrated relative to the light transmission characteristic of said infra-red filter means, whereby the measurements indicated upon said scales will be in similar terms of the standard of comparison and substractive to indicate the true color of the sample.

THOMAS R. GILLETT.
PHILIP F. MEADS.
ALFRED L. HOLVEN.